US010301773B2

(12) United States Patent
Safwat (10) Patent No.: US 10,301,773 B2
(45) Date of Patent: *May 28, 2019

(54) COVERBRAIDED ROPE FOR PELAGIC TRAWLS (71) Applicant: Sherif Adham Safwat, Odessa (UA)

(72) Inventor: Sherif Adham Safwat, Odessa (UA)

(73) Assignee: HAMPIDJAN, HF, Reykjavik (IS)

( * ) Notice: Subject to any disclaimer, the term of this patent is extended or adjusted under 35 U.S.C. 154(b) by 56 days.

This patent is subject to a terminal disclaimer.

(21) Appl. No.: 15/261,948

(22) Filed: Sep. 11, 2016

(65) Prior Publication Data

US 2017/0058454 A1    Mar. 2, 2017

Related U.S. Application Data (63) Continuation of application No. 14/368,799, filed on Jun. 25, 2014, now Pat. No. 9,464,382.

(51) Int. Cl.
*D07B 1/16* (2006.01)
*A01K 75/00* (2006.01)
*D07B 5/00* (2006.01)
*D04C 1/12* (2006.01)
*D07B 1/18* (2006.01)

(52) U.S. Cl.
CPC ............. *D07B 1/16* (2013.01); *A01K 75/00* (2013.01); *D04C 1/12* (2013.01); *D07B 5/005* (2013.01); *D07B 1/18* (2013.01); *D07B 2201/209* (2013.01); *D07B 2201/2086* (2013.01); *D07B 2201/2098* (2013.01); *D07B 2401/2055* (2013.01); *D07B 2501/2038* (2013.01)

(58) Field of Classification Search
CPC ................... D04C 1/12; D07B 2401/2055
See application file for complete search history.

(56) References Cited

U.S. PATENT DOCUMENTS

| | | | | |
|---|---|---|---|---|
| 2,587,117 A * | 2/1952 | Clay | ..... | D02G 3/322 28/155 |
| 3,336,744 A * | 8/1967 | Peene | ..... | D07B 1/062 57/212 |
| 3,805,508 A * | 4/1974 | Maderna | ..... | B60C 9/0007 57/212 |
| 5,572,860 A * | 11/1996 | Mitsumoto | ..... | D02G 3/324 57/210 |
| 5,744,206 A * | 4/1998 | Russek | ..... | D04C 1/02 138/123 |
| 6,357,164 B1 * | 3/2002 | Safwat | ..... | A01K 73/04 43/9.1 |
| 6,732,468 B2 * | 5/2004 | Safwat | ..... | A01K 73/04 43/9.1 |
| 7,147,904 B1 * | 12/2006 | Crawford | ..... | D02G 3/38 428/36.1 |

(Continued)

*Primary Examiner* — Shaun R Hurley
*Assistant Examiner* — Bao-Thieu L Nguyen
(74) *Attorney, Agent, or Firm* — Donald E. Schreiber (57) ABSTRACT A rope has a braided sheath that includes a spiraling strand having a greater pitch in comparison with a pitch exhibited by other strands of a coverbraid that encloses that rope's strength member core. The rope is useful for forming pelagic trawl mesh, and is stronger for a given amount of material, has less drag, and exhibits the same or bettered lift when towed through water at trawl mesh angles of attack. The rope also is less costly to manufacture in comparison to known helix rope constructions.

24 Claims, 1 Drawing Sheet (56) References Cited

U.S. PATENT DOCUMENTS

| | | | | |
|---|---|---|---|---|
| 8,484,941 | B2* | 7/2013 | Malafaya Oliveira Sa | D07B 1/005 57/230 |
| D695,527 | S* | 12/2013 | Javits, Jr. | D5/7 |
| D695,528 | S* | 12/2013 | Javits, Jr. | D5/7 |
| D695,529 | S* | 12/2013 | Javits, Jr. | D5/7 |
| 8,695,317 | B2* | 4/2014 | Erlendsson | D07B 5/00 57/310 |
| 9,464,382 | B2* | 10/2016 | Safwat | D07B 5/005 |
| 2002/0083820 | A1* | 7/2002 | Greenhalgh | B32B 5/26 87/8 |
| 2003/0093938 | A1* | 5/2003 | Safwat | A01K 73/04 43/9.1 |
| 2005/0150370 | A1* | 7/2005 | Nishri | D04C 1/02 87/33 |
| 2005/0160656 | A1* | 7/2005 | Safwat | A01K 73/045 43/9.95 |
| 2006/0272196 | A1* | 12/2006 | Safwat | A01K 73/02 43/9.95 |
| 2007/0079483 | A1* | 4/2007 | Gunnarsson | A01K 75/00 24/129 R |
| 2011/0110633 | A1* | 5/2011 | Erlendsson | D07B 1/147 385/101 |
| 2012/0118131 | A1* | 5/2012 | Erlendsson | A01K 75/00 87/6 |
| 2014/0345183 | A1* | 11/2014 | Erlendsson | D07B 5/00 43/9.95 |

* cited by examiner

US 10,301,773 B2

COVERBRAIDED ROPE FOR PELAGIC TRAWLS

This patent application is a continuation of U.S. patent application Ser. No. 14/368,799 filed Jun. 25, 2014; that claimed priority under 35 U.S.C. § 371 from Patent Cooperation Treaty ("PCT") International Patent Application no. PCT/IS2012/0500017 filed Dec. 27, 2012; that claims the benefit of U.S. Provisional Patent Application 61/631,115 filed Dec. 27, 2011.

TECHNICAL FIELD

The present disclosure relates generally to the technical field of ropes and more particularly to ropes used in forming pelagic mesh in pelagic trawls where such ropes are formed from a strength member core surrounded by a braided sheath wherein the braided sheath is formed of several strands and one of the strands is significantly larger in diameter than the other strands so as to form a series of cambered sections capable of either or both causing lift and/or reducing drag when such rope is subjected to water flow about the rope in a position that corresponds to a position assumed by ropes used in forming pelagic trawl mesh in pelagic trawls. Such ropes are known as "helix ropes".

BACKGROUND ART

Pelagic trawls include trawls used to catch Alaska pollock, blue whiting, capelin, herring, mackerel, pearlside, hoki, hake and other fish species. Pelagic trawls have their pelagic mesh formed mainly of ropes. Pelagic mesh in a pelagic trawl is mesh having a mesh size that is three meters (3 m) and greater. A main problem in the pelagic trawl fishing industry and the pelagic trawl net manufacturing industry is high operational costs minimizing profitability. Price competition is severe and thus high cost and high quality ropes such as ropes used in climbing applications, yachting applications and seismic applications, to name a few are not feasible for use in forming the pelagic mesh of pelagic trawls because the pelagic mesh are constantly damaged and replaced, and require replacement even when not damaged as they are made as thin and as light as possible in order to minimize drag and concurrent fuel consumption, and thus are worked at high loads relative to break points and therefore fail rather quickly. For this reason, more costly coverbraided (including "overbraided") ropes, as opposed to braid jacketed twines used in small mesh netting of say lesser than six hundred millimeters (600 mm) mesh size, are not favored for forming the pelagic mesh of pelagic trawls. Indeed, considering the world wide pelagic trawl industry as a whole, it is a fact that it is against the trend in the industry to design and form the pelagic mesh portion of pelagic trawls from coverbraided ropes.

Due to the severe price competition, presently the vast majority of pelagic trawls have their pelagic mesh portion formed of non-jacketed braided or twisted twines. These are low cost to produce, low cost to replace, and easy to splice. It is important that the ropes be easy to splice as splicing has become the dominant form of connecting front part mesh in pelagic trawls as it is much stronger than knotting and also much lower in drag than knotting, allowing much lowered manufacture costs as well as lowered drag and concurrent lowered fuel consumption. The difficulty in splicing coverbraided ropes and especially in splicing tightly coverbraided ropes such as helix ropes is another reason that coverbraided ropes have lost favor among pelagic trawl manufacturers and end users.

One of the main problems caused by the fact that coverbraided ropes are largely out of favor in forming the pelagic mesh portion of pelagic trawls is that the most easily handled and in fact the preferred variant of self spreading meshed trawls employ a coverbraid in the self spreading rope construction and it is self spreading trawls that have the lowest environmental impact of all pelagic trawl constructions. Thus, it is important to increase market demand for self spreading trawls in order to increase the use of low environmental impact pelagic trawls. Ultimately, it is catch per unit effort that is most important to fishing company customers. Therefore, if such new self spreading rope constructions are to gain acceptance by the fishermen, newer and better self-spreading rope constructions for self spreading trawls must better some factor that the bettering of which improves the catch per unit effort. Likewise, if market demand is to be increased for such self-spreading trawls, that are the variety of pelagic trawls that have the lowest environmental impact of any type of pelagic trawl, such self spreading trawls must increase the catch per unit effort.

The main factor in improving catch per unit effort of pelagic trawls at the rope level is to reduce the drag of a rope at angles of attack found in the pelagic netting portions of pelagic trawls and consequently the drag of a pelagic trawl. Even more importantly, is to both reduce the drag while concurrently either maintaining the amount of lift and/or increasing the amount of lift compared to what is presently exhibited by the lowest drag embodiments of self spreading trawls. The reduced drag concurrently reduces fuel consumption, and also can increase trawl opening, while sufficient lift maintains the trawl open along its length during turns and side currents thereby permitting marine mammal escape and precluding marine mammal by-catch. In addition to preventing marine mammal by-catch, the self spreading trawls being able to retain open their long dimension during turns and side currents means that fish herded into and along the length of the trawl are not sieved through the mesh and de-scaled and lost, to die of de-scaling while not being counted to the catch quota, but rather are properly herded into the collection bag and counted to the catch quota. The counting to the catch quota of fish killed by the trawl is essential to preserving healthy fisheries as well as to preserving the food source for marine mammals and seabirds. Furthermore, both the lower drag of as well as the sufficient lifting forces of self spreading trawls independently or concurrently lead to increased catch per unit effort, and thus lead to increased customer acceptance and demand, causing the self spreading trawls to be used with their favorable environmental properties as opposed to use of alternative trawl types that do not possess the favorable environmental impact properties of self spreading trawls.

Helix ropes, as defined above and also further defined herein, are used in self spreading pelagic trawls known as "Helix Trawls" manufactured and sold by Hampidjan HF of Iceland. The original teaching of such helix ropes is contained within now Published Patent Cooperation Treaty (PCT) International Publication No. WO/1998/046070, International Application No. PCT/US1998/007848 (see FIG. 29), and a latter teaching of such helix ropes also is contained within now Published Patent Cooperation Treaty (PCT) International Publication No. WO 03/081989 A2, International Application No. PCT/US03/10114 (see FIG. 5). Helix ropes, and the "Helix Trawls" manufactured by Hampidjan HF of Iceland, have acquired a reputation of exhibiting excessively greater drag than modern, state of the art cordage used to form other pelagic trawl nets and especially non-self spreading pelagic trawl nets in the present state of the art. The increased drag concurrently results in smaller trawl openings, reduced towing speed and increased fuel consumption at given tow speeds. For this reason the use of helix ropes to form self spreading trawls such as Helix Trawls has not gained wide acceptance among fishing entities, despite the fact that they offer other favorable properties, such as preventing by-catch of marine mammals that would otherwise be caught in non-self spreading trawls when the back end of such non-self spreading trawls collapses, such also as enhanced ability to selectively fish as the trawls do not collapse, and other. Problematically, it is the helix ropes that also are the preferred form of a self spreading rope for forming a self spreading pelagic trawl because they are the most reliable embodiment of a self spreading rope useful for forming a self spreading pelagic trawl, other embodiments having lost favor and no longer being in use.

Beyond the highly favorable environmental factors of helix rope formed pelagic trawls, there are other instances when helix rope formed pelagic trawls are highly useful. These include in slow trawl speed applications, and in quick turning applications at deep depths with much warp out, as in these circumstances the self spreading properties of self spreading trawls prevents the trawls from collapsing, thereby not only preventing by-catch of marine mammals and enhancing selective fishing, but also maintaining the trawl fishing the selected species for a greater portion of the time. So, where such operational conditions prevail it is favorable to the final catch per unit effort equation to employ even the presently known higher drag and higher cost self spreading trawls formed of the helix rope. However, these circumstances are not the norm, but rather are the exception, and in such cases the greater fuel consumption of such trawls is not favored, but rather tolerated and it remains that lowering drag and concurrently lowering fuel consumption is a most important factor in increasing customer demand for such environmentally favorable trawls.

In attempt to solve problems present with known Helix ropes, International Application No. PCT/EP2010/060663 having International Publication No. WO 2011/009924 A2, and International Application No. PCT/EP2010/060670 having International Publication No. WO 2011/009929 A2 teach further embodiments for Helix ropes where such embodiment are lowered drag embodiments. However, as taught in such references, such embodiments also are higher in cost to produce than prior embodiments of Helix ropes. For this reason, these embodiments have failed to be adopted. Thus, it can readily be appreciated that it is important not only to reduce the drag of helix ropes, but also to reduce the cost of manufacturing a lowered drag helix rope. Furthermore, as the cost of a helix rope is widely considered in relation to an amount of strength obtained from a helix rope for a certain cost to produce such helix rope, it can readily be appreciated that it is important to both lower the drag of a helix rope as well as to reduce the cost to manufacture a lowered drag helix rope in order to accelerate adoption into the commercial midwater and/or pelagic trawl fishing industry of the environmentally friendly helix rope and thus permit the fisheries, fish and resource as well as the fishermen, marine mammals and seabirds whose livelihoods depend upon such fish and resource to benefit from the reduced by-catch and reduced fossil fuel consumption associated with the use of a lowered drag helix rope in forming midwater and/or pelagic trawls.

Thus, it can readily be appreciated that a long felt needs exists to provide an alternative rope that reduces drag in comparison to known helix rope constructions while also maintaining the positive characteristics and associated benefits of known helix rope constructions, so as to reduce the drag of pelagic trawls, while maintaining positive benefits, in order to once again generate favor among fishing entities to use the low environmental impact self spreading trawls that also greatly enhances marine mammal safety and permits more selective fishing, while concurrently reducing fuel consumption per unit of fish caught.

Thus also, it can readily be appreciated that a long felt needs exists to provide a rope having reduced drag as well as reduced manufacture costs, compared to known helix rope constructions, so as to reduce the drag and cost of pelagic trawls formed of such helix rope.

Thus yet again also, it can readily be appreciated that a long felt needs exists to provide a rope having reduced drag compared to known helix ropes, to reduce the manufacture costs of trawls formed of such reduced drag ropes, and also to at least preserve the amount of lift that such reduced drag and reduced cost ropes are capable of generating while subject to a water stream and yet more preferably to increase the amount of lift such ropes are capable of creating while subject to a water stream, so as to reduce the drag and cost of pelagic trawls formed of such ropes while concurrently enhancing the environmentally superior properties of such trawls.

To further describe a helix rope: a helix rope is a type of a "coverbraided" rope, the term "coverbraided" rope also known herein and in the industry as "overbraided" rope. The cover or sheath is formed by a braided sheath that is itself formed of strands. What distinguishes a helix rope from any other type of tightly coverbraided rope useful in forming pelagic mesh in pelagic trawls is that in a helix rope one of the strands forming the braided sheath is substantially larger than the other strands forming the braided sheath. The state of the art and the trend in the industry in forming any helix rope for the commercial pelagic trawl net industry is to form the braided sheath, including the spiraling strand, where the spiraling strand either is:

(a) one of a total quantity of strands forming the braided sheath where: (i) the total quantity of strands forming the braided sheath preferably is an even number quantity; and (ii) the spiraling strand follows the same path around and about the outside of the strength member core as do all other strands forming the braided sheath; and (b) the spiraling strand follows the same path around and about the outside of the strength member core as do all other strands forming the braided sheath (i.e. has the same pick angle and/or same braid angle and/or same lay angle and/or same amount of advance as do other strands forming the braided sheath), with some alternative embodiments of such embodiment including that the spiraling strand is not included within the braided sheath but is adhered and/or otherwise formed onto the outside surface of the braided sheath, such as by extrusion.

Thus, it can readily again be appreciated that the present state of the art as well as the present trend in the industry teaches one to form a helix rope where the path that a spiraling strand follows along and about the outside of the strength member core and/or around and about the external portion of the helix rope is same as the path followed by individual strands forming the remainder of the braided sheath that is formed about the outside of the strength member core.

One advantage of known constructions of helix ropes is that all strands forming the braided sheath are similarly tightly bound to the strength member core as well as to one another, making for a very tightly braided enveloping braided sheath that tightly binds the enclosed strength member core, thereby making for a maximally rigid coverbraided rope, as is the goal of the industry in employing coverbraids about strength member cores. That is, it is the goal of the industry to achieve a maximally rigid rope for use in pelagic trawl mesh when forming a coverbraid about a strength member core, and for this reason the coverbraid is formed as tight as feasible, as the tighter the coverbraid, the more rigid the resulting rope. It thus can readily be appreciated that the state of the art and the trend in the industry is to make all strands forming a braided sheath about a strength member core equally tightly bound to the strength member core and unable to have any part of any of the strands forming the cover braid be pulled away from the core by the fingers of a person of usual strength when the rope is bent or when it is not bent. This is accomplished by both coaxing the tension on the braiding strands as tight as feasible during the coverbraided process while also forming the coverbraid in such a fashion and construction that all strands forming the coverbraid have a same pitch, and are all equally woven into the braided construction of the coverbraided sheath enveloping the strength member core.

Thus, it can readily again be appreciated that the present state of the art as well as the present trend in the industry teaches one to form a helix rope where a spiraling strand included in the helix rope has a same pitch as do other strands forming the braided sheath of the helix rope.

DISCLOSURE

It is an object of the present disclosure to provide for a rope of the present disclosure that is useful for forming pelagic mesh in pelagic trawls and that has lesser drag when subjected to water flow at trawl mesh angles of attack than known helix ropes, as well as processes for forming and using such.

Another object of the present disclosure is to provide for a rope of the present disclosure that is useful for forming pelagic mesh in pelagic trawls and that is stronger than known constructions of helix rope, as well as processes for forming and using such.

Yet another object of the present disclosure to provide for a rope of the present disclosure that is useful for forming pelagic mesh in pelagic trawls and that has lesser drag when subjected to water flow at trawl mesh angles of attack than known helix ropes while also being less costly to manufacture.

Yet another object of the present disclosure is to provide for a rope of the present disclosure that is useful for forming pelagic mesh in pelagic trawls, that is stronger for a given amount of material, has lesser drag and is capable of exhibiting same or bettered lift when subjected to water flow at trawl mesh angles of attack, while also being less costly to manufacture, in comparison to known helix rope constructions.

Disclosed is a construction for a low drag and improved strength rope of the present disclosure that achieves the stated objects of the present disclosure, and processes for forming such. Most broadly, the construction of the low drag and improved strength rope of the present disclosure comprises a strand 36 arranged and included into the rope 35 so as to spiral about the rope 35, the spiraling strand 36 having a larger diameter than strands 397 forming the braided sheath, and where the spiraling strand 36 exhibits a greater pitch in comparison to a pitch exhibited by strands 397 forming the braided sheath about the strength member core 37.

For the purposes of the present disclosure, the term "pitch" means the amount of advance in one turn of one strand twisted about another strand or strands (or about the strength member 37) when viewed axially. Thus, the amount of advance of the spiraling strand 36 in one turn about the remainder of rope 35 and/or about the strength member core 37, when viewed axially, is greater than the amount of advance exhibited by a strand 397 in one turn about the remainder of rope 35 and/or about the strength member core 37, when viewed axially. Consequently, and in other terms, the spiraling strand exhibits less linear length per unit length of the rope 35 in comparison to the linear length exhibited by strands 397 per unit length of the rope 35.

In other embodiments, it is said that the spiraling strand exhibits a braid angle that is an angle that is more acute than a braid angle exhibited by other strands 397 forming the braided sheath forming the rope of the present disclosure. For the purposes of the present disclosure, the term "braid angle" is defined as the angle that braid yarns and/or strands make with respect to the longitudinal axis of the rope 35. The braid angle of the strands 397 and the braid angle of the spiraling strand 36 is described with reference to FIG. 1 as follows: Imaginary straight dashed line 401 is parallel to the longitudinal axis of rope 35; Imaginary straight dashed line 403 is parallel to the longitudinal axis of strands 397; and Imaginary straight dashed line 404 is parallel to the longitudinal axis of spiraling strand 36. The braid angle of strands 397 is identified by reference numeral 407 (i.e. angle Alpha) and is defined by the more acute angle formed by the intersection of imaginary straight dashed line 403 with imaginary straight dashed line 401. The braid angle of spiraling strand 36 is identified by reference numeral 406 (i.e. angle Beta) and is defined by the more acute angle formed by the intersection of imaginary straight dashed line 404 with imaginary straight dashed line 401.

In the presently preferred embodiment of the instant disclosure the braid angle for the spiraling strand 36 is lesser than the braid angle for strands 397 forming the braided sheath.

In other terms, it is said that the spiraling strand exhibits a braid angle that is different than a braid angle exhibited by the majority, and preferably by all, of the strands 397 forming the braided sheath 398 that is formed about the strength member of the rope of the present disclosure 35. More specifically, the braid angle of the spiraling strand 36 is selected so that the spiraling strand has less linear length per unit length of the rope 35 in comparison to the linear length per unit length of the rope 35 exhibited by strands 397 forming the braided sheath 398. Such constructions for a rope of the present disclosure as disclosed herein are contrary to the state of the art and against the trend in the industry.

In a most preferred embodiment, the helix strand passes underneath other strands forming the braided sheath with a frequency that is lesser than is a frequency with which other strands forming the braided sheath are passed underneath one another. That is, the spiraling strand is woven into the braided sheath less often per unit of distance along the long dimension of the rope of the present disclosure than are other strands forming the braided sheath. However, in alternative embodiments, the spiraling strand is not woven into the braided sheath, but is adhered to the remainder of the rope such as by use of an adhesive to attach a preformed strand to the outside of the braided sheath or by use of an extrusion process that simultaneously forms the spiraling strand while also causing portions of the spiraling strand to adhere to the braided sheath and/or to be injected and inserted into and within the braided sheath and even into the strength member core so as to cause both adhesion as well as mechanical attachment of the extruded spiraling strand to the remainder of the rope of the present disclosure body.

Further disclosed is a construction of a rope of the present disclosure and process for forming such having greater strength than known constructions of helix rope. Most broadly such construction of a rope of the present disclosure includes a spiraling strand included within the strands forming that braided sheath where such spiraling strand is both larger in diameter than other strands forming the braided sheath; is passed under other strands forming the braided sheath a lesser number of times per unit distance along the long dimension of the rope of the present disclosure, i.e. is passed under other strands forming the braided sheath with a lesser frequency than other strands forming the braided sheath are passed under one another; is bound to the strength member contained within the braided sheath by other strands forming the braided sheath and with a lesser frequency of binding than are other strands forming the braided sheath (i.e. the spiraling strand is bound to the strength member and to the remainder of the braided sheath by other strands forming the braided sheath and with less passes underneath another strand forming the braided sheath per unit distance along the long dimension of the rope of the present disclosure in comparison to the amount of passes used to bind to the braided sheath other strands forming the braided sheath). The spiraling strand may have a different elasticity, such as a lower elasticity and/or a higher elasticity than other strands forming the braided sheath, with a lower elasticity presently preferred. In one embodiment, the spiraling strand is a braided construction, and in another embodiment it is a monofilament of a material including polyurethane or the like, and in yet another embodiment it has a twisted construction wherein the lay direction of the twisted spiraling strand corresponds to the direction of lay that the spiraling strands forms about the strength member and the remainder of the braided sheath.

Possessing the preceding characteristics, the rope of the present disclosure answers needs long felt in the industry.

These and other features, objects and advantages are likely to be understood or apparent to those of ordinary skill in the art upon having read the present disclosure and accompanying various drawing figures.

BEST MODE FOR CARRYING OUT THE DISCLOSURE

Figure 1:
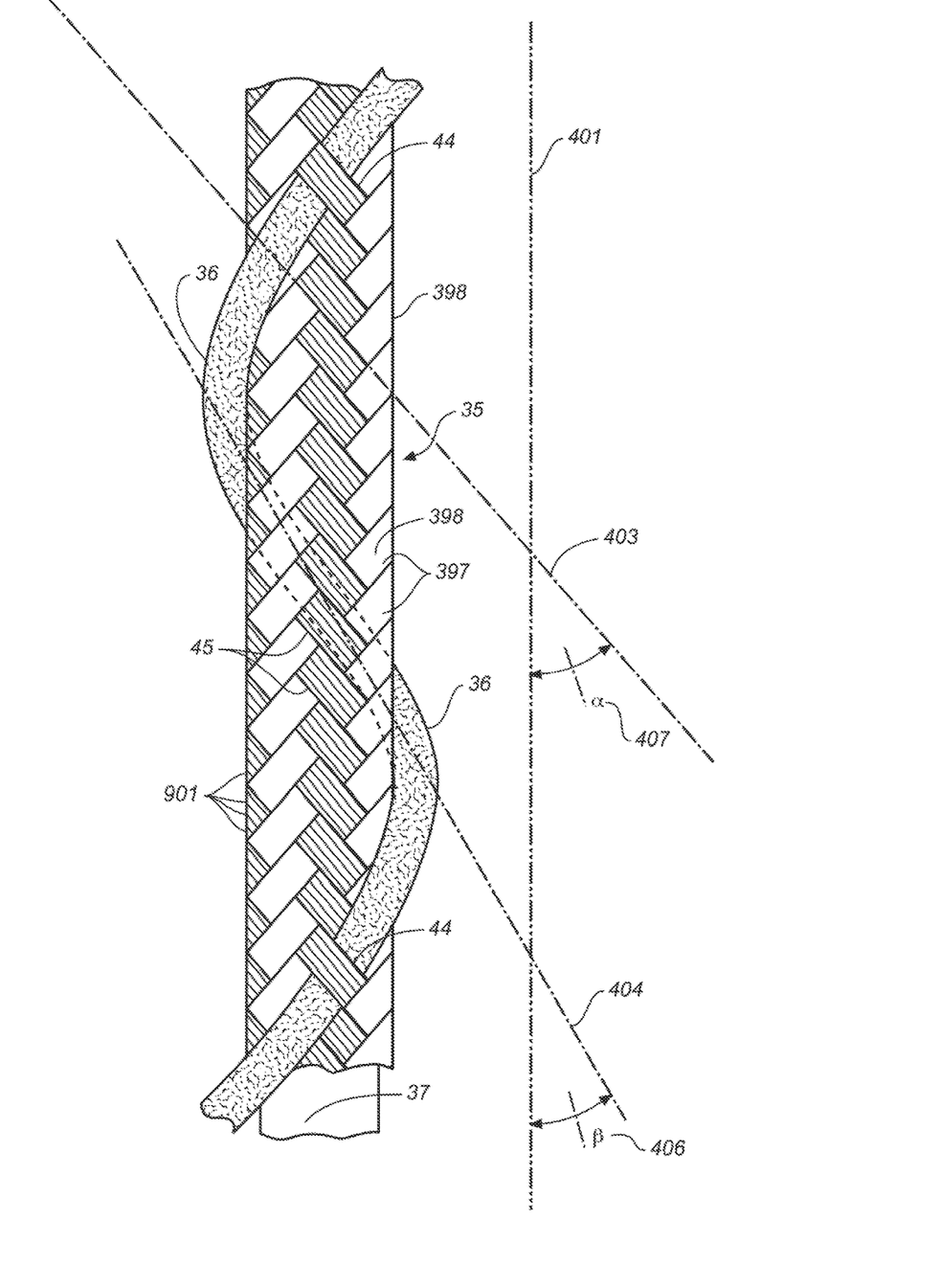
FIG. 1 is a plan view of a section of a rope of the present disclosure in accordance with the present disclosure.

FIG. 1 illustrates a rope of the present disclosure in accordance with the present disclosure that is identified by the general reference character 35. In reference to FIG. 1, the rope of the present disclosure 35 of the present disclosure includes a braided sheath 398 formed about a strength member core 37. The braided sheath 398 is formed of multiple strands 397 and at least one spiraling strand 36. The spiraling strand 36 preferably is included within the braided sheath in the manner and fashion as taught above and herein, but also alternatively may be situated mainly about the outside of the braided sheath 398 in the manner and fashion as taught herein, such as when spiraling strand 36 is formed of a substance such as polyurethane and adhered mainly to the outside of braided sheath 398.

The present disclosure is based upon the surprising and unexpected discovery that a rope 35 of the present disclosure having a longer pitch for its spiraling strand 36 in comparison to other strands 397 forming the braided sheath 398, as is contrary to the state of the art and against the trend in the industry, provides a highly favorable rope 35 for forming the pelagic netting portion of pelagic trawls by achieving and satisfying the above described long felt needs of the industry and accomplishing the objects of the present disclosure. The result of forming pelagic trawls of the rope of the present disclosure is selected from a group consisting of lowered fuel consumption, lowered trawl drag, greater trawl mouth opening, bettered efficiency of pelagic trawl fishing operations, lowered trawl production costs and improved environmental impact of pelagic trawl fishing operations. The rope of the present disclosure itself has the consequences of lowered low-drag rope production costs, lowered drag in comparison to known helix ropes, and lift sufficient to improve trawl opening and efficiency of fishing operations in comparison to known helix rapes constructions while concurrently maintaining the improved environmental impact of helix rope self spreading trawl constructions.

The construction of the rope of the present disclosure includes the spiraling strand 36 having a greater pitch in comparison to a pitch exhibited by other strands 397 forming the braided sheath 398 that forms the coverbraid about the strength member core 37. In other embodiments, it is said that the spiraling strand exhibits a pick angle that is an angle that is more acute than a braid angle exhibited by other strands forming the braided sheath forming the rope of the present disclosure.

In a most preferred embodiment, the spiraling strand 36 passes underneath other strands forming the braided sheath 398 with a frequency that is lesser than is a frequency with which other strands 397 forming the braided sheath 398 are passed underneath one another. That is, the spiraling strand 36 is woven into the braided sheath less often per unit of distance along the long dimension of the rope 35 than are other strands 397 forming the braided sheath 398. A consequence of this construction for a rope of the present disclosure is that the spiraling strand is less tightly bound to the remainder of the rope and also is less tightly bound to the strength member core than are other strands 397 forming the braided sheath, as is contrary to the state of the art and against the trend in the industry that is to make all strands forming a braided sheath about a strength member core equally tightly bound to the strength member core and unable to have any part of the strand pulled away from the core by the fingers of a person of usual strength when the rope is bent or when it is not bent.

Further disclosed is a construction of a rope 35 and process for forming such having greater strength than known constructions of helix rope. Most broadly such construction of a rope 35 of the present disclosure includes a spiraling strand 36 included within the other strands 397 forming that braided sheath 398 where such spiraling strand 36 is both larger in diameter than other strands 397 forming the braided sheath 398; is passed under other strands 397 forming the braided sheath 398 at spiraling strand bindings 44 formed of the other strands 397 a lesser number of times per unit distance along the long dimension of the rope 35, i.e. is passed under other strands 397 forming the braided sheath at spiraling strand bindings 44 with a lesser frequency than other strands 397 forming the braided sheath 398 are passed under one another; is bound to the strength member contained within the braided sheath by other strands 397 forming the braided sheath and with a lesser frequency of binding than are other strands 397 forming the braided sheath 398 (i.e. the spiraling strand 36 is connected to the strength member 37 and to the remainder of the braided sheath 398 by other strands 397 forming the braided sheath and with less passes underneath another strand 397 forming the braided sheath per unit distance along the long dimension of the rope 35 in comparison to the amount of passes used to bind to the braided sheath 398 other strands 397 forming the braided sheath 398). The spiraling strand 36 may have a different elasticity, such as a lower elasticity and/or a higher elasticity than other strands forming the braided sheath 398, with a lower elasticity presently preferred. In one embodiment, the spiraling strand 36 is a braided construction, and in another embodiment it is a monofilament of a material including polyurethane or the like, and in yet another embodiment it has a twisted construction wherein the lay direction of the twisted spiraling strand corresponds to the direction of lay that the spiraling strand forms about the strength member 37 and the remainder of the braided sheath 398.

Possessing the preceding characteristics, the rope 35 of the present disclosure answers needs long felt in the industry.

EXAMPLES

The following examples describe presently preferred embodiments of the rope 35 of the present disclosure:
1. An improved rope (35) for forming portions of a trawl, the rope including at least one strength member (37), at least a braided sheath (398) formed about and enclosing the strength member (37), and at least one strand (36) disposed in a spiral fashion about at least the at least one strength member, the braided sheath (398) including strands (397) forming at least portions of the braided sheath (398), the strands (397) having a pitch and the spiraling strand (36) having a pitch, the rope (35) characterized in that the pitch of the spiraling strand (36) differs from the pitch of the strands (397) that form the braided sheath (398), whereby at least rope strength is bettered.
2. The rope of example 1 wherein the pitch of the spiraling strand (36) is at least four percent greater than the pitch of the strands (397).
3. The rope of example 1 wherein the spiraling strand (36) exhibits at least four percent less linear length per unit length of the rope (35) in comparison to the linear length exhibited by strands (397) per unit length of the rope (35).
4. The rope of example 1 wherein the spiraling strand (36) exhibits at least six percent less linear length per unit length of the rope (35) in comparison to the linear length exhibited by strands (397) per unit length of the rope (35).
5. The rope of example 1 wherein the spiraling strand (36) exhibits at least eight percent less linear length per unit length of the rope (35) in comparison to the linear length exhibited by strands (397) per unit length of the rope (35).
6. The rope of example 1 wherein the spiraling strand (36) exhibits at least ten percent less linear length per unit length of the rope (35) in comparison to the linear length exhibited by strands (397) per unit length of the rope (35).
7. The rope of example 1 wherein the spiraling strand (36) exhibits at least twelve percent less linear length per unit length of the rope (35) in comparison to the linear length exhibited by strands (397) per unit length of the rope (35).
8. The rope of example 1 wherein the spiraling strand (36) exhibits at least fourteen percent less linear length per unit length of the rope (35) in comparison to the linear length exhibited by strands (397) per unit length of the rope (35).
9. The rope of example 1 wherein the spiraling strand (36) exhibits at least eighteen percent less linear length per unit length of the rope (35) in comparison to the linear length exhibited by strands (397) per unit length of the rope (35).
10. The rope of example 1 wherein the spiraling strand (36) exhibits at least twenty-four percent less linear length per unit length of the rope (35) in comparison to the linear length exhibited by strands (397) per unit length of the rope (35).
11. The rope of any one of examples 1 to 10 wherein the spiraling strand (36) is bound to the remainder of the rope by spiraling strand bindings (44), the quantity of spiraling strand bindings (44) per unit distance along the long dimension of the rope (35) being a lesser quantity of bindings than are created by other bindings (45) that connect strands (397) forming the braided sheath (398) to: the braided sheath (398); one another (i.e, to strands (397); and to the strength member (37).
12. The rope of any one of examples 1 to 11 wherein the rope is used for forming portions of netting forming at least a part of the front part of the pelagic trawl.
13. The rope of any one of examples 1 to 11 wherein strands (397) exhibit a braid angle and wherein the spiraling strand (36) exhibits a braid angle, and where the spiraling strand exhibits a braid angle that is different than a braid angle exhibited by the majority of the strands (397) forming the braided sheath 398.
14. The rope of any one of examples 1 to 11 wherein strands (397) exhibit a braid angle and wherein the spiraling strand (36) exhibits a braid angle, and where the spiraling strand exhibits a braid angle that is more acute than a braid angle exhibited by the majority of the strands 397 forming the braided sheath 398.
15. The rope of any one of examples 1 to 14 wherein the spiraling strand is formed of a monofilament and exhibits a cross sectional form selected from a group consisting of: circular, quasi-circular; oval; and quasi-oval.
16. The rope of any one of examples 1 to 14 wherein the spiraling strand (36 provides at least one fourteenth, by volume, of the total volume of the rope (35).
17. The rope of any one of examples 1 to 14 wherein the spiraling strand (36) provides at least one eleventh, by volume, of total the volume of the rope (35).
18. The rope of any one of examples 1 to 14 wherein the spiraling strand (36) provides at least one eighth, by volume, of the total volume of the rope (35).
19. The rope of any one of examples 1 to 14 wherein the spiraling strand (36) provides at least one sixth, by volume, of the total volume of the rope (35).
20. The rope of any one of examples 1 to 14 wherein the spiraling strand (36) provides at least one fifth, by volume, of the total volume of the rope (35).
21. The rope of any one of examples 1 to 20 wherein strands (397) forming the braided sheath (398) exhibit a flattened form.

Ideally, the strands 397 are not circular in cross section. but are flattened, such as a tape, with a minimal thickness and a maximum width. The aspect ratio of the flattened strand 397 can be from 50:1 to 2:1, with from 2:1 to 12:1 being presently used, with at least 3:1, 4:1, 5:1, 6:1, 7:1 and 8:1 being preferred. This requires that each strand 397 is itself formed of at least two, and up to at least two hundred, individual linear elements (hereinafter "sub-strands") 901 that themselves are either fibers and/or filaments, or are plaits of fibers and/or filaments. Presently, each strand 397 is preferably formed of for example, three sub-strands for a smaller diameter rope of the present disclosure, up to ten sub strands for a larger diameter rope of the present disclosure, with at least two to three sub-strands for ropes of the present disclosure of a diameter (herein including "equivalent diameter") of lesser than nine mm being presently preferred, and with at least three to five sub-strands for ropes of the present disclosure of a diameter greater than nine mm being presently preferred. The term "equivalent diameter" shall mean the diameter a rope would be if it was a rope having a circular cross section, when measured with about ten Kg of tension, say nine to eleven Kg of tension. This can be calculated by measuring the volumetric displacement of a rope, and applying that to a cylindrical form, in order to arrive at the cylinder's diameter.

The thickness of the wall of the braided sheath 398 is preferentially less than one millimeter, and may be up to two millimeters or even more.

When the strength member 37 is selected to be a braided strength member, the braid angle of the other strands 397 forming the braided sheath 398 differ from and preferably are greater than the braid angle of strands forming the braided strength member 37. When the strength member is a twisted strength member, the pitch of the other strands 397 forming the braided sheath differ from the pitch of the strands forming the strength member 37.

In all embodiments, the strength member 37 preferably is formed of a substance that is more elastic than a substance mainly forming strands 397.

In order to optimize the flattened form of each such strand 397, the multiple individual sub-strands 901 either are laid parallel to one another or are loosely laid (i.e. twisted) about one another so as to result, after being braided about the strength member core 37, in the flattened tape-like shape mentioned above. Presently, parallel laid is the preferred embodiment. The sub-strands themselves either can be parallel laid or twisted plaits and formed either of further sub-sub-strands or of individual filaments and/or fibers.

As shall be readily apparent to those skilled in the art upon having read the instant disclosure, the exact count of the sub-strands 901 to form strands 397 forming the braided sheath of any particular rope of the present disclosure is determined by several factors, primarily being:

a) a diameter of strength member core 37 that forms the core about which the braided sheath is formed;

b) a desired thickness of the braided sheath;

c) a desired pick-angle and corresponding constructional elongation ability of the braided sheath;

d) a desired strength and elasticity of the braided sheath in relation to the strength and elasticity of the strength member core 37 forming the core; and e) a selected filament and/or fiber type for forming the strands and/or sub-strands.

Experimentation with any carrier count and strand count, for any particular braiding machinery, taking into account at least the above factors shall allow those skilled in the art to determine whether the sub-strands forming the strands 397 are better laid parallel to one another or loosely twisted, and to what degree to twist them if they are to be twisted, i.e. what pitch they are best twisted at.

For example, for a roughly ten to twelve millimeter diameter rope of the present disclosure of a minimal strand count according to the known art, each strand is formed of three parallel yarns, and each of the yarns has six monofilaments within it that are twisted rather loosely. The looseness of the twist is selected so that the monofilaments in the yarn can move relative to one another so as to permit the yarn to form a flattened shape to the yarn when the braided sheath is formed. The monofilaments may be of circular cross section or may be of a "side-by-side" cross sectional configuration. One skilled in the art can begin with this formula, and upon having read the information contained within the instant disclosure, empirically derive a suitable strand construction for use in forming any diameter of any ropes of the present disclosure, it being the practice in the art to empirically derive any rope construction formulas to fit any particular fabrication plant's particular braiding machinery, twisting machinery, filament type, tension applied to carrier strands, diameters and other characteristic of the components, machinery and methods in forming a certain rope.

Most ideally, those sub-strands that pack better, i.e. result in minimal void space and preferentially no void space between the sub-strands, as well as between the strands themselves that form the braided sheath, are preferable for a given strength. Various conventional sub-strands having asymmetrical cross sections that also are sufficiently strong while packing better than circular cross sectional shaped sub-strands are useful.

Ideally, the sub-strands forming the strands 397 that in turn form the braided sheath 398 have minimal and preferably no void space between one another. For maximal abrasion resistance and aesthetic acceptance by end users, ideally each of the strands 397 contact adjacent strands 397, so that portions of strength member core 37 or portions of whatever is enveloped by the braided sheath is not discernible by an unaided healthy human eye.

For a superior drag reducing embodiment, at least some diameters of rope of the present disclosure including approximately sixteen mm and eighteen mm diameters have been found to have a lowest drag when void space exists between adjacent strands forming the braided sheath, so that what is enveloped by the braided sheath is discernible by an unaided healthy human eye. In such embodiments it is still preferable that the rope of the present disclosure has minimal, including no void space between sub-strands forming the strands making up the braided sheath.

To assist this preferred construction of the sub-strands and strands, a type of monofilament known as "glued together" or "side by side" monofilament, is highly useful and presently preferred. Such monofilaments are made by extruding two circular cross section monofilaments from dies that are situated very close to one another so that prior to the filaments fully drying the adjacent filaments adhere to one another, forming a monofilament of a roughly figure eight cross section.

However, when such "side by side" monofilament strands are not available, circular cross sectional shaped sub-strands are highly useful.

Polyethylene and various forms of high tenacity polyethylene are useful for forming the braided sheath as well as the spiraling strand, and any hydro-phobic substances are preferred for lower drag applications than hydrophilic substances for forming the braided sheath and the strands and sub-strands. In certain applications and especially in high abrasion applications nylons, filaments used to form kraftrope and other hydrophilic substances are useful.

In order to use the rope of the present disclosure to form a lowered drag self spreading trawl it is needed to:

(a) form as much of the mesh of the pelagic trawl as possible, and especially as much of the pelagic mesh of the trawl as possible, from the rope of the present disclosure; and (b) position the rope of the present disclosure in such a fashion that it has a particular orientation relative to the exterior of the trawl and also relative to the long dimension of the trawl. More particularly, the rope of the present disclosure is used to form mesh bars and/or mesh legs of the trawl where ropes of the present disclosure 35 having either right handed or left handed lay orientations for the spiraling strand are selected and positioned so that when viewed from external at least the top and sides of the trawl, and in the instances of a pure midwater trawl that shall not be fished in bottom contact when viewed from all sides of the trawl, with the mesh legs and/or mesh bars at intended angles of attack and intended percentages of mesh opening, the cambered sections of that portion of each rope of the present disclosure that is external the trawl are able to generate lift vectors having greater magnitudes normalized to the long dimension of the trawl and directed away from the interior of the trawl compared to the lift vector magnitudes directed toward the long axis of the trawl and able to be generated by those cambered sections that are on the portions of the ropes of the present disclosure internal the trawl. In other words, those cambered sections on the portion of the ropes of the present disclosure that are external the trawl are more parallel to the intended oncoming water flow vector and/or to the planned long dimension of the trawl than are the cambered sections of each rope of the present disclosure that are internal the trawl.

(c) Another way of describing such orientation for ropes of the present disclosure to best be used to form a lowered drag self spreading trawl is that when viewed from a position both external the trawl as well as looking from the mouth of the trawl toward the aft of the trawl, those ropes of the present disclosure 35 having right handed lays for their spiraling strands direction about the main rope of the present disclosure body have their leading edges being the left hand side of each such rope of the present disclosure, while those ropes of the present disclosure 35 having left handed lays for their spiraling strands direction about the main rope of the present disclosure body have their leading edges being the right hand side of such ropes of the present disclosure.

Other uses for ropes of the present disclosure include forming lowered drag pelagic trawls and/or portions of lowered drag pelagic trawls, such as portions of four meter mesh size and lower, where the lay orientation and/or orientation of the cambered sections of the ropes of the present disclosure is not controlled so as to result in a self spreading trawl. One fashion of forming such a lowered drag trawl of the present disclosure is to form all or as much as possible of the pelagic mesh of a trawl from ropes of the present disclosure 35 where all such ropes of the present disclosure have the same lay direction for their spiraling strand.

SPLICING EMBODIMENTS OF THE PRESENT DISCLOSURE

In order to minimize drag of pelagic trawls formed of ropes of the present disclosure, it is best to form slings of rope of the present disclosure and connect those to form the pelagic mesh. Especially, such slings are used to form the legs and/or mesh bars of the pelagic mesh. A sling is a section of a rope having an eye at both ends, although in some instances an eye could be at only one end. To achieve the minimized drag it is needed to maximize the strength of the eye, and this is accomplished by forming an eye with a spliced connection where such spliced connection is made in such a fashion as to conserve more of the rope of the present disclosure's breaking strength than is able to be conserved by the use of knots practical for use in pelagic trawls (i.e. knots not so bulky as to result in a high drag trawl, or in an easily abraded trawl). The term "spliced sling" for purposes of the instant disclosure shall mean a portion of a rope of the present disclosure having a spliced eye located at one or both ends of itself.

INDUSTRIAL APPLICABILITY

A rope of the present disclosure and a sling formed from a rope of present disclosure as formed by the process taught hereinabove is useful for forming self spreading trawls, for forming non-self spreading lowered drag trawls, and for forming self spreading lowered drag trawls of lowered noise and also for forming lowered drag trawls of lowered noise.

PRODUCTION METHODS

In order to form a preferred embodiment of the rope of the present disclosure, and in particular in order to form that embodiment of the rope of the present disclosure where the spiraling strand 36 is bound to the rope body by means of being woven into the other strands 397 forming the braided sheath, although with a different weaving construction than is applied to other strands 397 forming the braided sheath, a new braiding apparatus is required:

The new braiding apparatus includes a standard braiding apparatus useful for forming a standard coverbraided and/or overbraided rope having a central strength member core, except that there is an additional planetary carrier apparatus orbiting around the outside of the usual planetary carrier apparatus. The secondary planetary carrier apparatus ideally is positioned lower than, that is beneath, the usual planetary carrier apparatus and/or apparatuses, such as by being attached to a lower plate of the braiding machine, and may optimally orbit at a lower speed than does the primary carrier apparatus. The effect of the lower orbit speed is to cause a spool containing the twine that is to form the spiraling twine 36 (i.e. the spiraling twine spool) to orbit at a lower rate of revolutions per unit time than do spools carrying strands that are to form strands 397 that are used in forming the primary braided sheath. Additionally, the number of times that the carrier apparatus passes the spiraling spool underneath spools of strands 397 forming the primary braided sheath is less frequent in comparison with number of times that strands forming the primary braided sheath pass under one another. A result is that in the final formed rope of the present disclosure the spiraling strand 36 exhibits a longer pitch than do strands 397 forming the primary braided sheath, and is attached and thus bound to the rope body 35, and to the braided sheath 398, less frequently than are strands 397 forming the primary braided sheath attached and thus bound to one another and to the rope body.

The invention claimed is:

1. An improved rope (35) for forming portions of a trawl, the rope including at least one strength member (37), at least a braided sheath (398) formed about and enclosing the strength member (37), and at least one spiraling strand (36) where such spiraling strand (36) is larger in diameter than other strands (397) forming at least portions of the braided sheath (398), the rope characterized in that the spiraling strand is a preformed strand that is adhered to the outside of the braided sheath (398); and by an amount of advance of the spiraling strand (36) in one turn about the strength member core (37) differing from an amount of advance of a strand (397) in one turn about the strength member core (37).

2. The rope of claim 1 wherein the amount of advance of the spiraling strand (36) is greater than the amount of advance of the strand (397) per unit length of the rope (35).

3. The rope of claim 2 wherein the spiraling strand is a monofilament.

4. The rope of claim 2 wherein the spiraling strand (36) is adhered to the outside of the braided sheath (398) by use of an adhesive.

5. The rope of claim 4 wherein the spiraling strand is a monofilament.

6. The rope of claim 2 wherein the spiraling strand is formed of a substance that has a different elasticity than a substance mainly forming the strand (397).

7. The rope of claim 6, wherein the spiraling strand is formed of a substance that is more elastic than a substance mainly forming the strand (397).

8. The process of claim 7 further comprising a step of using an adhesive to adhere the preformed spiraling strand (36) to the outside of the braided sheath.

9. The process of claim 8 further comprising selecting to form the spiraling strand as a monofilament.

10. The process of claim 8 further comprising selecting to form the spiraling strand of a substance that has a different elasticity than does a substance mainly forming the strand (397).

11. The process of claim 10 further comprising selecting to form the spiraling strand of a substance that is more elastic than a substance mainly forming the strand (397).

12. The rope of claim 1 wherein the spiraling strand is a monofilament.

13. The rope of claim 1 wherein the spiraling strand (36) is adhered to the outside of the sheath (398) by use of an adhesive.

14. The rope of claim 13 wherein the spiraling strand is a monofilament.

15. The rope of claim 1 wherein the spiraling strand is formed of a substance that has a different elasticity than a substance mainly forming the strand (397).

16. A process for forming an improved rope (35) for forming portions of a trawl, the rope including at least one strength member (37), at least a braided sheath (398) formed about and enclosing the strength member (37), and at least one spiraling strand (36) where such spiraling strand (36) is larger in diameter than other strands (397) forming at least portions of the braided sheath (398), the process comprising a step of preforming the spiraling strand (36), followed by a step of adhering the preformed spiraling strand (36) to the outside of the braided sheath while selecting an amount of advance for the spiraling strand (36) in one turn about the strength member core (37) different in comparison to an amount of advance selected for a strand (397) in one turn about the strength member core (37).

17. The process of claim 16 further comprising selecting to form the spiraling strand as a monofilament.

18. The process of claim 16 further comprising selecting to form the spiraling strand of a substance that has a different elasticity than does a substance mainly forming the strand (397).

19. The process of claim 18 further comprising selecting to form the spiraling strand of a substance that is more elastic than a substance mainly forming the strand (397).

20. The process of claim 18 further comprising selecting to form the spiraling strand as a monofilament.

21. The process of claim 16 wherein the amount of advance of the spiraling strand (36) is selected to be greater than the amount of advance of the strand (397) per unit length of the rope (35).

22. The process of claim 21 further comprising selecting to form the spiraling strand as a monofilament.

23. The process of claim 21 further comprising selecting to form the spiraling strand of a substance that has a different elasticity than does a substance mainly forming the strand (397).

24. The process of claim 23 further comprising selecting to form the spiraling strand of a substance that is more elastic than a substance mainly forming the strand (397).

* * * * *